United States Patent
Zhang

(10) Patent No.: US 9,024,528 B2
(45) Date of Patent: May 5, 2015

(54) LED BACKLIGHT DRIVING CIRCUIT, BACKLIGHT MODULE, AND LIQUID CRYSTAL DISPLAY DEVICE

(71) Applicant: Shenzhen China Star Optoelectronics Technology Co., Ltd., Shenzhen, Guangdong (CN)

(72) Inventor: Hua Zhang, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 63 days.

(21) Appl. No.: 13/882,170

(22) PCT Filed: Mar. 28, 2013

(86) PCT No.: PCT/CN2013/073340
§ 371 (c)(1),
(2) Date: Apr. 27, 2013

(87) PCT Pub. No.: WO2014/146310
PCT Pub. Date: Sep. 25, 2014

(65) Prior Publication Data
US 2014/0285748 A1 Sep. 25, 2014

(30) Foreign Application Priority Data
Mar. 19, 2013 (CN) .......................... 2013 1 0087555

(51) Int. Cl.
*H01J 1/60* (2006.01)
*G02F 1/1335* (2006.01)
*H05B 33/08* (2006.01)

(52) U.S. Cl.
CPC ...... *G02F 1/133603* (2013.01); *H05B 33/0887* (2013.01)

(58) Field of Classification Search
USPC ............. 315/129, 133, 185 R, 186, 246, 247, 315/250, 291, 294, 297, 307, 308
See application file for complete search history.

(56) References Cited

U.S. PATENT DOCUMENTS

| 2004/0239243 A1* | 12/2004 | Roberts et al. ................ 313/512 |
| 2006/0083031 A1* | 4/2006 | Cook, II .......................... 363/20 |
| 2007/0236155 A1* | 10/2007 | Kao et al. ...................... 315/247 |
| 2010/0308742 A1* | 12/2010 | Melanson ..................... 315/224 |
| 2012/0268011 A1* | 10/2012 | Shiu et al. ..................... 315/121 |

\* cited by examiner

*Primary Examiner* — Tung X Le
(74) *Attorney, Agent, or Firm* — Andrew C. Cheng

(57) ABSTRACT

The present invention provides a LED backlight driving circuit, a backlight module, and a liquid crystal display device, wherein, the LED backlight driving circuit comprises: a power module, a voltage converting module, a constant current driving IC module, and a boost module. The output terminal of the power module is connected with the power source of the constant current driving IC module through the voltage converting module; the output terminal of the power module is connected with the positive electrode of the LED strings through the boost module. The boost module is provided with an over voltage alarm unit used to warn that the voltage of the positive electrode of the LED strings is high. In the present invention, it can warn immediately and notice the failures when the output voltage of the LED backlight driving circuit is too high or the failure happens.

17 Claims, 4 Drawing Sheets

LED BACKLIGHT DRIVING CIRCUIT, BACKLIGHT MODULE, AND LIQUID CRYSTAL DISPLAY DEVICE

This application claims priority to Chinese Patent Application Serial No. 201310087555.X, named as "LED backlight driving circuit, backlight module, and liquid crystal display device", filed on Mar. 19, 2013, the specification of which is incorporated herein by reference.

BACKGROUND OF THE INVENTION

1. Field of the Invention

The present invention relates to the field of liquid crystal display techniques, and in particular to an LED backlight driving circuit, a backlight module, and a liquid crystal display device.

2. The Related Arts

The backlight driving circuit of the light emitting diode (LED) provided in the prior art is shown in FIG. 1. When the driving signal is high, the metal-oxide-semiconductor field-effect transistor (MOSFET) is on, and the inductor current increases, which stores the energy. When the driving signal is low, the MOSFET is off, and the inductor generates the reverse induced electromotive force, which is connected in series with the input voltage 24V, and releasing the energy to the LED strings. At this time, the positive electrode voltage of the LED strings is very high, which is $Vo=24/(1-D)$, where D is the duty cycle of the driving signal. If the number of each LED strings is 10, Vo is 60~70V generally, this high voltage exceeds the human safety voltage 36V.

Therefore, the LED backlight driving circuit provided in the prior art has the following disadvantages.

The output voltage of the LED backlight driving circuit is higher, if someone touches the circuit while it is operating, he will get hurt; when the LED backlight driving circuit is operating abnormal, it is possible to find out where the problem is by measuring the voltage and the current of each circuits one-by-one through the oscilloscope. The circuit board is still under the input power of 24V in this process, it may appear unpredictable security risks during the debugging process, and the working efficiency will also be reduced.

SUMMARY OF THE INVENTION

The technical problem solved by the present invention is providing a LED backlight driving circuit, a backlight module, and a liquid crystal display device, which can warn immediately and notice the failures when the output voltage of the LED backlight driving circuit is too high or the failure happens.

In order to solve the above technical problem, the present invention provides a LED backlight driving circuit, wherein, it comprises: a power module, a voltage converting module, a constant current driving IC module, and a boost module. The output terminal of the power module is connected with the power source of the constant current driving IC module through the voltage converting module. The output terminal of the power module is connected with the positive electrode of the LED strings through the boost module. The boost module is provided with an over voltage alarm unit used to warn that the voltage of the positive electrode of the LED strings is high.

Wherein, the over voltage alarm unit is used to indicate whether the boost module fails or not.

Wherein, it further comprises: a power module failure alarm unit, which is used to indicate whether the power module fails or not.

Wherein, it further comprises: a constant current driving IC module failure alarm unit, which is used to indicate that whether the constant current driving IC module fails or not.

Wherein, the boost module comprises an energy storage inductor, a rectifier diode, a MOSFET, and an output electrolytic capacitor;

the positive electrode of the rectifier diode is connected with the power module through the energy storage inductor, the negative electrode of which is connected with the LED strings;

one end of the output electrolytic capacitor is connected with the negative electrode of the rectifier diode, and the other end is connected to the ground;

the drain of the MOSFET is connected with the positive electrode of the rectifier diode, the source of which is connected to the ground, the gate of which is connected with a MOS driving signal output terminal of the constant current driving IC module;

the over voltage alarm unit is connected between the energy storage inductor and the positive electrode of the rectifier diode.

Wherein, when the LED driver circuit is working, the over voltage alarm unit lighting indicates that the positive electrode voltage of the LED strings is under high voltage.

Wherein, the power module failure alarm unit is connected in series between the output terminal of the power module and the energy storage inductor of the boost module.

Wherein, the constant current driving IC module failure alarm unit is connected in series between the power source of the constant current driving IC module and the voltage converting module.

Wherein, the over voltage alarm unit, the power module failure alarm unit, and the constant current driving IC module failure alarm unit are LEDs.

Wherein, when the over voltage alarm unit stops flashing, it indicates that the boost module is failed; when the power module failure alarm unit does not light, it indicates that the power module is failed; when the constant current driving IC module failure alarm unit does not light, it indicates that the constant current driving IC module is failed.

In order to solve the above technical problem, the present invention utilizes another technical embodiment to provide a backlight module, wherein, it comprises a LED backlight driving circuit. The LED backlight driving circuit comprises: a power module, a voltage converting module, a constant current driving IC module, a boost module. The output terminal of the power module is connected with the power source of the constant current driving IC module through the voltage converting module. The output terminal of the power module is connected with the positive electrode of the LED strings through the boost module. The boost module is provided with an over voltage alarm unit used to warn that the voltage of the positive electrode of the LED strings is high. The over voltage alarm unit is used to indicate whether the boost module fails or not.

Wherein, the LED backlight driving circuit further comprises:

a power module failure alarm unit, which is used to indicate whether the power module fails or not;

a constant current driving IC module failure alarm unit, which is used to indicate that whether the constant current driving IC module fails or not.

Wherein, the boost module comprises an energy storage inductor, a rectifier diode, a MOSFET, and an output electrolytic capacitor;

the positive electrode of the rectifier diode is connected with the power module through the energy storage inductor, the negative electrode of which is connected with the LED strings;

one end of the output electrolytic capacitor is connected with the negative electrode of the rectifier diode, and the other end is connected to the ground;

the drain of the MOSFET is connected with the positive electrode of the rectifier diode, the source of which is connected to the ground, the gate of which is connected with a MOS driving signal output terminal of the constant current driving IC module;

the over voltage alarm unit is connected between the energy storage inductor and the positive electrode of the rectifier diode.

Wherein, when the LED driver circuit is working, the over voltage alarm unit lighting indicates that the positive electrode voltage of the LED strings is under high voltage.

Wherein, the power module failure alarm unit is connected in series between the output terminal of the power module and the energy storage inductor of the boost module; the constant current driving IC module failure alarm unit is connected in series between the power source of the constant current driving IC module and the voltage converting module.

Wherein, the over voltage alarm unit, the power module failure alarm unit, the constant current driving IC module failure alarm unit are LEDs.

Wherein, when the over voltage alarm unit stops flashing, it indicates that the boost module is failed;

when the power module failure alarm unit does not light, it indicates that the power module is failed;

when the constant current driving IC module failure alarm unit does not light, it indicates that the constant current driving IC module is failed.

In order to solve the above technical problem, the present invention utilizes another technical embodiment to provide a liquid crystal display device, wherein, it comprises a backlight module. The backlight module comprises LED backlight driving circuit, which comprises: a power module, a voltage converting module, a constant current driving IC module, a boost module. The output terminal of the power module is connected with the power source of the constant current driving IC module through the voltage converting module. The output terminal of the power module is connected with the positive electrode of the LED strings through the boost module. The boost module is provided with an over voltage alarm unit used to warn that the voltage of the positive electrode of the LED strings is high. The over voltage alarm unit is used to indicate whether the boost module fails or not.

Wherein, the LED backlight driving circuit further comprises:

a power module failure alarm unit, which is used to indicate whether the power module fails or not;

a constant current driving IC module failure alarm unit, which is used to indicate that whether the constant current driving IC module fails or not.

Wherein, the boost module of the LED backlight driving circuit comprises an energy storage inductor, a rectifier diode, a MOSFET, and an output electrolytic capacitor;

the positive electrode of the rectifier diode is connected with the power module through the energy storage inductor, the negative electrode of which is connected with the LED strings;

one end of the output electrolytic capacitor is connected with the negative electrode of the rectifier diode, and the other end is connected to the ground;

the drain of the MOSFET is connected with the positive electrode of the rectifier diode, the source of which is connected to the ground, the gate of which is connected with a MOS driving signal output terminal of the constant current driving IC module;

the over voltage alarm unit is connected between the energy storage inductor and the positive electrode of the rectifier diode.

The present invention has the following beneficial effects.

The over voltage alarm unit or the power module failure alarm unit are added in the LED backlight driving circuit. When the LED backlight driving circuit is working normally, if the over voltage alarm unit lights up, indicating that the positive electrode voltage of the LED strings is high, do not touch; if the LED backlight driving circuit is working abnormally, the power module failure alarm unit will alert, which can quickly determine whether the constant driving IC module is abnormal or the fuse in the input terminal of the power module breaks down, etc. It reduces the time of the abnormal operation of the circuit board during the debugging process, increases the security, and improves the working efficiency.

BRIEF DESCRIPTION OF THE DRAWINGS

In order to more clearly describe the embodiments in the present invention or the technical solutions in the prior art, there will briefly describe the drawings utilized in the embodiments or the prior art descriptions as following, obviously, the drawings in the descriptions is just several embodiments of the present invention, for the ordinary skilled personnel, they can obtain other drawings according to these drawings under the premise of non-creative effort.

DETAILED DESCRIPTION OF THE PREFERRED EMBODIMENTS

The detailed descriptions accompanying drawings and the embodiment of the present invention are as follows.

The present invention provides a LED backlight driving circuit, which can warn immediately and notice the failure when the output voltage of the LED backlight driving circuit is too high or the failure happens.

Figure 1:
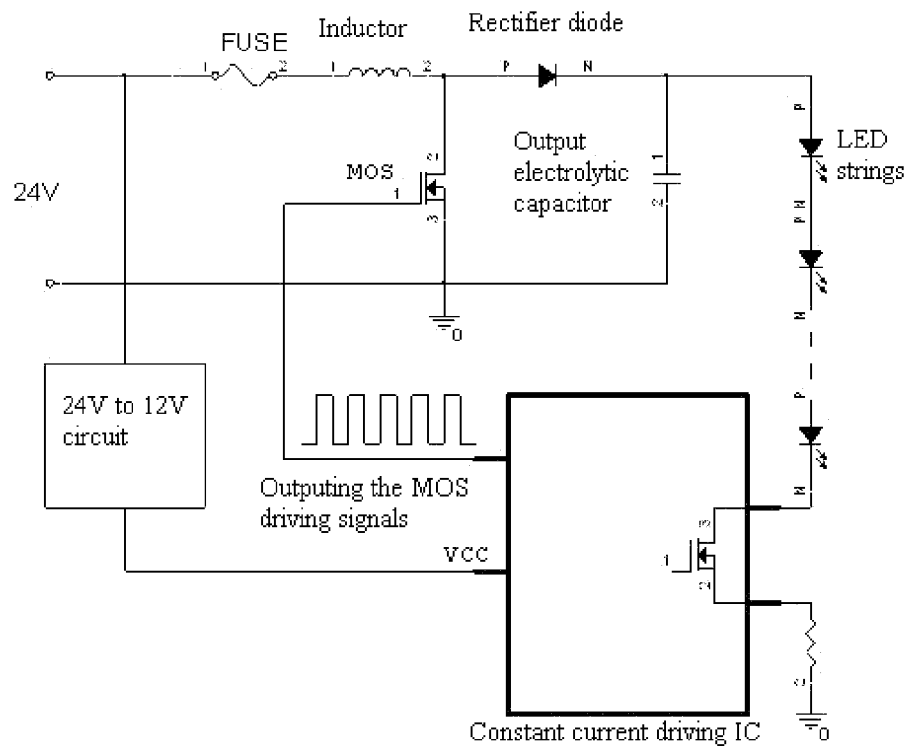
FIG. 1 is a schematic structural diagram of the LED backlight driving circuit according to the prior art.
Figure 2:
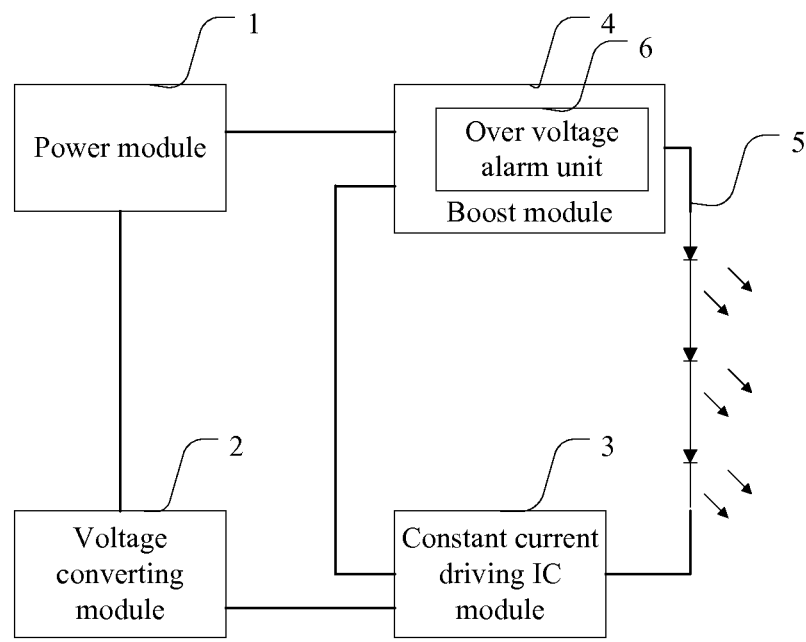
FIG. 2 is a schematic structural diagram of the LED backlight driving circuit according to the first embodiment of the present invention.

Referring to FIG. 2, it is a schematic structural diagram of the LED backlight driving circuit according to the first embodiment of the present invention.

The LED backlight driving circuit according to the present invention comprises:

a power module 1, a voltage converting module 2, a constant current driving IC module 3, a boost module 4;

the output terminal of the power module 1 is connected with the power source of the constant current driving IC module 3 through the voltage converting module 2;

the output terminal of the power module 1 is connected with the positive electrode of the LED strings 5 through the boost module 4;

the boost module 4 is provided with an over voltage alarm unit 6 used to warn that the voltage of the positive electrode of the LED strings 5 is high. Wherein, when the LED driver circuit is working, the over voltage alarm unit 6 lighting indicates that the positive electrode voltage of the LED strings is under high voltage. At this time, the operator can not touch the LED backlight driving circuit to prevent getting hurt.

On the other hand, the over voltage alarm unit 6 is also used to indicate whether the boost module 4 fails or not. Specifically, when the over voltage alarm unit 6 lights off, it means that the boost module 4 has failed.

Figure 3:
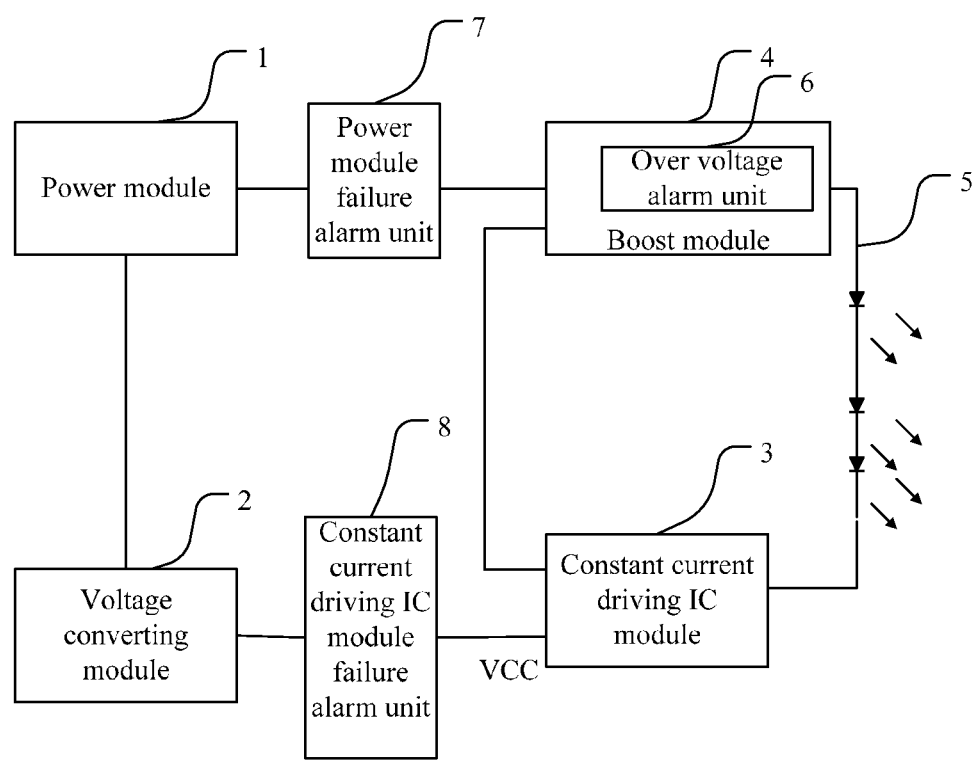
FIG. 3 is a schematic structural diagram of the LED backlight driving circuit according to the second embodiment of the present invention.

Referring to FIG. 3, it is a schematic structural diagram of the LED backlight driving circuit according to the second embodiment of the present invention.

Except each module and component in the first embodiment, the LED backlight driving circuit according to the second embodiment further comprises:

a power module failure alarm unit 7, which is used to indicate whether the power module 1 fails or not;

a constant current driving IC module failure alarm unit 8, which is used to indicate whether the constant current driving IC module 3 fails or not.

Specifically, when the power module 1 of the LED backlight driving circuit is working normally, the power module failure alarm unit 7 lights up; when the power module failure alarm unit 7 lights off, it indicates the power module is failed.

When the constant current driving IC module 3 of the LED backlight driving circuit is working normally, the constant current driving IC module failure alarm unit 8 lights up; when the constant current driving IC module failure alarm unit 8 lights off, it indicates the constant current driving IC module 3 is failed.

Figure 4:
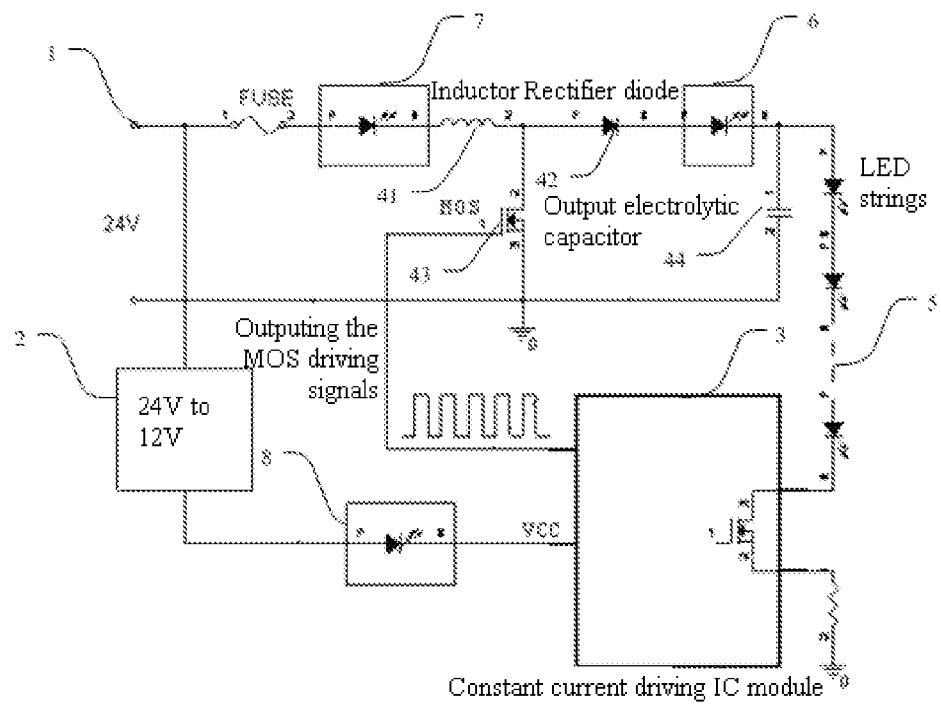
FIG. 4 is a schematic structural diagram of the LED backlight driving circuit according to the third embodiment of the present invention.

Referring to FIG. 4, it is a schematic structural diagram of the LED backlight driving circuit according to the third embodiment of the present invention.

The third embodiment will describe the circuit structure of the LED backlight driving circuit, wherein, the power module 1 is specifically a 24V AC power, on which a fuse is connected. The voltage converting module 2 converts the 24V AC power provided by the power module 1 to a 12V AC power. One end of the constant current driving IC module 3 is connected with the LED strings 5, the MOS driving signal output terminal outputs the MOS driving signals.

More specifically, the boost module 4 comprises an energy storage inductor 41, a rectifier diode 42, a MOSFET 43 and an output electrolytic capacitor 44;

the positive electrode of the rectifier diode 42 is connected with the power module 1 through the energy storage inductor 41, the negative electrode of which is connected with the LED strings 5;

one end of the output electrolytic capacitor 44 is connected with the negative electrode of the rectifier diode 42, and the other end is connected to the ground;

the drain of the MOSFET 43 is connected with the positive electrode of the rectifier diode 42, the source of which is connected to the ground, the gate of which is connected with the MOS driving signal output terminal of the constant current driving IC 3.

In present embodiment, the over voltage alarm unit 6, the power module failure alarm unit 7, and the constant current driving IC module failure alarm unit 8 are LEDs.

The over voltage alarm unit 6 is connected between the storage inductor 41 and the positive electrode of the rectifier diode 42.

The power module failure alarm unit 7 is connected in series between the output terminal of the power module 1 and the energy storage inductor 41 of the boost module 4.

Wherein, the constant current driving IC module failure alarm unit 8 is connected in series between the power source of the constant current driving IC module 3 and the voltage converting module 2.

Specifically, when the circuit is working normally, the LED lights due to the passed current. The red LED at the output electrolytic capacitor 44 lighting can warn that there is high voltage and dangerous. The red LED at the other lines lighting indicates that the circuit is working normally. When the circuit is working abnormally, the red LED light off, it indicates that the circuit has troubles.

Figure 5:
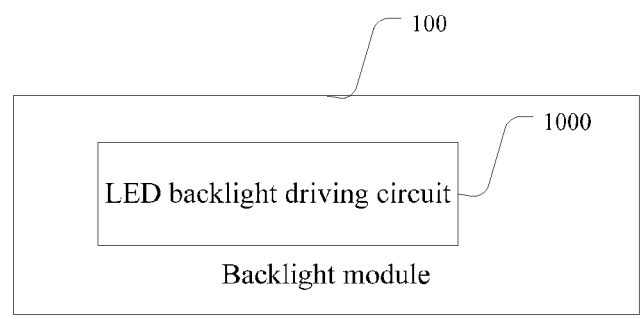
FIG. 5 is a schematic structural diagram of the backlight module according to the present invention.

The present invention provides a backlight module 100, and the specific structure refers to FIG. 5. The backlight module 100 comprises a LED backlight driving circuit 1000.

As shown in FIG. 2, the LED backlight driving circuit comprises:

a power module 1, a voltage converting module 2, a constant current driving IC module 3, a boost module 4;

the output terminal of the power module 1 is connected with the power source of the constant current driving IC module 3 through the voltage converting module 2;

the output terminal of the power module 1 is connected with the positive electrode of the LED strings 5 through the boost module 4;

the boost module 4 is provided with an over voltage alarm unit 6 used to warn that the voltage of the positive electrode of the LED strings 5 is high;

the over voltage alarm unit 6 is also used to indicate whether the boost module fails or not.

Wherein, the LED backlight driving circuit further comprises:

a power module failure alarm unit 7, which is used to indicate whether the power module 1 fails or not;

a constant current driving IC module failure alarm unit 8, which is used to indicate whether the constant current driving IC module 3 fails or not.

Wherein, the boost module 4 comprises an energy storage inductor 41, a rectifier diode 42, a MOSFET 43 and an output electrolytic capacitor 44;

the positive electrode of the rectifier diode 42 is connected with the power module 1 through the energy storage inductor 41, the negative electrode of which is connected with the LED strings 5;

one end of the output electrolytic capacitor 44 is connected with the negative electrode of the rectifier diode 42, and the other end is connected to the ground;

the drain of the MOSFET 43 is connected with the positive electrode of the rectifier diode 42, the source of which is connected to the ground, the gate of which is connected with the MOS driving signal output terminal of the constant current driving IC 3;

the over voltage alarm unit 6 is connected between the storage inductor 41 and the positive electrode of the rectifier diode 42.

Wherein, when the LED backlight driving circuit is work normally, the over voltage alarm unit 6 lighting indicates that the positive electrode voltage of the LED strings is high.

Wherein, the power module failure alarm unit 7 is connected in series between the output terminal of the power module 1 and the energy storage inductor 41 of the boost module 4; the constant current driving IC module failure alarm unit 8 is connected in series between the constant current IC module 3 and the voltage converting module 2.

Wherein, the over voltage alarm unit 6, the power module failure alarm unit 7, and the constant current driving IC module failure alarm unit 8 are LEDs.

Wherein, when the over voltage alarm unit 6 stops flashing, it indicates that the boost module 4 is failed; when the power module failure alarm unit 7 does not light, it indicates that the power module 1 is failed; when the constant current driving IC module failure alarm unit 8 does not light, it indicates that the constant current driving IC module 3 is failed.

Figure 6:
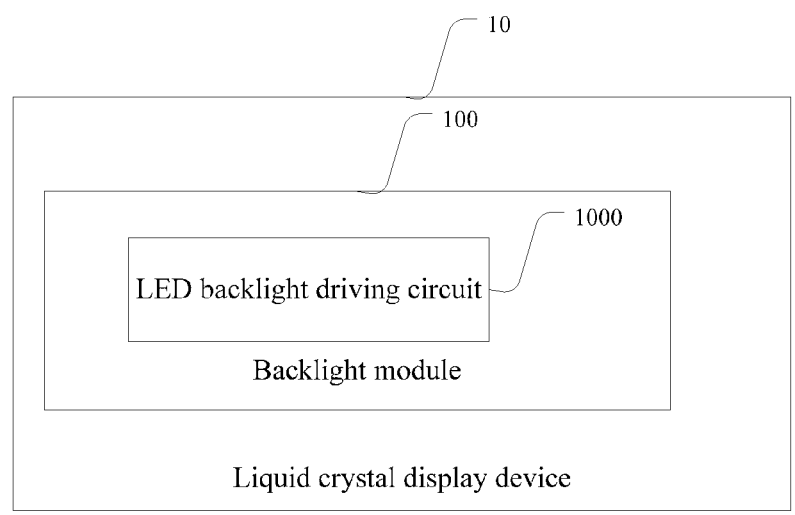
FIG. 6 is a schematic structural diagram of the liquid crystal display device according to the present invention.

The present invention provides a liquid crystal display device 10, it comprises a backlight module 100. The backlight module 100 comprises a LED backlight driving circuit 1000, the specific structure refers to FIG. 6.

As shown in FIG. 2, the LED backlight driving circuit comprises:
a power module 1, a voltage converting module 2, a constant current driving IC module 3, a boost module 4;
the output terminal of the power module 1 is connected with the power source of the constant current driving IC module 3 through the voltage converting module 2;
the output terminal of the power module 1 is connected with the positive electrode of the LED strings 5 through the boost module 4;
the boost module 4 is provided with an over voltage alarm unit 6 used to warn that the voltage of the positive electrode of the LED strings 5 is high;
the over voltage alarm unit 6 is also used to indicate whether the boost module 4 fails or not.

Wherein, the LED backlight driving circuit further comprises:
a power module failure alarm unit 7, which is used to indicate whether the power module 1 fails or not;
a constant current driving IC module failure alarm unit 8, which is used to indicate whether the constant current driving IC module 3 fails or not.

Wherein, the boost module 4 comprises an energy storage inductor 41, a rectifier diode 42, a MOSFET 43 and an output electrolytic capacitor 44;
the positive electrode of the rectifier diode 42 is connected with the power module 1 through the energy storage inductor 41, the negative electrode of which is connected with the LED strings 5;
one end of the output electrolytic capacitor 44 is connected with the negative electrode of the rectifier diode 42, and the other end is connected to the ground;
the drain of the MOSFET 43 is connected with the positive electrode of the rectifier diode 42, the source of which is connected to the ground, the gate of which is connected with the MOS driving signal output terminal of the constant current driving IC 3;
the over voltage alarm unit 6 is connected between the storage inductor 41 and the positive electrode of the rectifier diode 42.

Wherein, when the LED backlight driving circuit is work normally, the over voltage alarm unit 6 lighting indicates that the positive electrode voltage of the LED strings is high.

Wherein, the power module failure alarm unit 7 is connected in series between the output terminal of the power module 1 and the energy storage inductor 41 of the boost module 4; the constant current driving IC module failure alarm unit 8 is connected is series between the constant current IC module 3 and the voltage converting module 2.

Wherein, the over voltage alarm unit 6, the power module failure alarm unit 7, and the constant current driving IC module failure alarm unit 8 are LEDs.

Wherein, when the over voltage alarm unit 6 stops flashing, it indicates that the boost module 4 is failed; when the power module failure alarm unit 7 does not light, it indicates that the power module 1 is failed; when the constant current driving IC module failure alarm unit 8 does not light, it indicates that the constant current driving IC module 3 is failed.

The present invention has the following beneficial effects.

The over voltage alarm unit or the power module failure alarm unit are added in the LED backlight driving circuit. When the LED backlight driving circuit is working normally, if the over voltage alarm unit lights up, indicating that the positive electrode voltage of the LED strings is high, do not touch; if the LED backlight driving circuit is working abnormally, the power module failure alarm unit will alert, which can quickly determine whether the constant driving IC module is abnormal or the fuse in the input terminal of the power module breaks down, etc. It reduces the time of the abnormal operation of the circuit board during the debugging process, increases the security, and improves the working efficiency.

The disclosed embodiments are the preferred embodiments of the present invention, but not intending to impose any unduly constraint to the appended claims. Any equivalent change is considered encompassed in the scope of protection defined by the claims of the present invention.

What is claimed is:

1. A LED backlight driving circuit, comprising:
a power module, a voltage converting module, a constant current driving IC module, a constant current driving IC module failure alarm unit and a boost module;
the output terminal of the power module being connected with the power source of the constant current driving IC module through the voltage converting module;
the output terminal of the power module being connected with the positive electrode of the LED strings through the boost module;
the constant current driving IC module failure alarm unit being used to indicate that whether the constant current driving IC module fails or not; and
the boost module being provided with an over voltage alarm unit used to warn that the voltage of the positive electrode of the LED strings being high.

2. The LED backlight driving circuit as claimed in claim 1, wherein the over voltage alarm unit is used to indicate whether the boost module fails or not.

3. The LED backlight driving circuit as claimed in claim 1, wherein the driving circuit further comprises: a power module failure alarm unit, which is used to indicate whether the power module fails or not.

4. The LED backlight driving circuit as claimed in claim 3, wherein, when the LED driver circuit is working, the over voltage alarm unit lighting indicates that the positive electrode voltage of the LED strings is under high voltage.

5. The LED backlight driving circuit as claimed in claim 3, wherein the power module failure alarm unit is connected in series between the output terminal of the power module and the energy storage inductor of the boost module.

6. The LED backlight driving circuit as claimed in claim 1, wherein the boost module comprises an energy storage inductor, a rectifier diode, a MOSFET, and an output electrolytic capacitor;

the positive electrode of the rectifier diode is connected with the power module through the energy storage inductor, the negative electrode of which is connected with the LED strings;

one end of the output electrolytic capacitor is connected with the negative electrode of the rectifier diode, and the other end is connected to the ground;

the drain of the MOSFET is connected with the positive electrode of the rectifier diode, the source of which is connected to the ground, the gate of which is connected with a MOS driving signal output terminal of the constant current driving IC module; and the over voltage alarm unit is connected between the energy storage inductor and the positive electrode of the rectifier diode.

7. The LED backlight driving circuit as claimed in claim 1, wherein the constant current driving IC module failure alarm unit is connected in series between the power source of the constant current driving IC module and the voltage converting module.

8. The LED backlight driving circuit as claimed in claim 1, wherein the over voltage alarm unit, the power module failure alarm unit, and the constant current driving IC module failure alarm unit are LEDs.

9. The LED backlight driving circuit as claimed in claim 8, wherein, when the over voltage alarm unit stops flashing, and indicates that the boost module is failed;

when the power module failure alarm unit does not light, and indicates that the power module is failed;

when the constant current driving IC module failure alarm unit does not light, and indicates that the constant current driving IC module is failed.

10. A backlight module, comprising a LED backlight driving circuit, which comprises:

a power module, a power module failure alarm unit, a voltage converting module, a constant current driving IC module, a constant current driving IC module failure alarm unit, and a boost module;

the output terminal of the power module being connected with the power source of the constant current driving IC module through the voltage converting module;

the output terminal of the power module being connected with the positive electrode of the LED strings through the boost module;

the power module failure alarm unit being used to indicate whether the power module fails or not;

the constant current driving IC module failure alarm unit being used to indicate that whether the constant current driving IC module fails or not;

the boost module being provided with an over voltage alarm unit used to warn that the voltage of the positive electrode of the LED strings being high; and the over voltage alarm unit being also used to indicate whether the boost module fails or not.

11. The backlight module as claimed in claim 10, wherein the boost module comprises an energy storage inductor, a rectifier diode, a MOSFET, and an output electrolytic capacitor;

the positive electrode of the rectifier diode is connected with the power module through the energy storage inductor, the negative electrode of which is connected with the LED strings;

one end of the output electrolytic capacitor is connected with the negative electrode of the rectifier diode, and the other end is connected to the ground;

the drain of the MOSFET is connected with the positive electrode of the rectifier diode, the source of which is connected to the ground, the gate of which is connected with a MOS driving signal output terminal of the constant current driving IC module; and the over voltage alarm unit is connected between the energy storage inductor and the positive electrode of the rectifier diode.

12. The backlight module as claimed in claim 11, wherein when the LED driver circuit is working, the over voltage alarm unit lighting indicates that the positive electrode voltage of the LED strings is under high voltage.

13. The backlight module as claimed in claim 12, wherein the power module failure alarm unit is connected in series between the output terminal of the power module and the energy storage inductor of the boost module; the constant current driving IC module failure alarm unit is connected in series between the power source of the constant current driving IC module and the voltage converting module.

14. The backlight module as claimed in claim 13, wherein the over voltage alarm unit, the power module failure alarm unit, and the constant current driving IC module failure alarm unit are LEDs.

15. The backlight module as claimed in claim 14, wherein, when the over voltage alarm unit stops flashing, and indicates that the boost module is failed;

when the power module failure alarm unit does not light, and indicates that the power module is failed;

when the constant current driving IC module failure alarm unit does not light, and indicates that the constant current driving IC module is failed.

16. A liquid crystal display device, comprising a backlight module, the backlight module comprising a LED backlight driving circuit, the LED backlight driving circuit comprising:

a power module, a power module failure alarm unit, a voltage converting module, a constant current driving IC module, a constant current driving IC module failure alarm unit, and a boost module;

the power module failure alarm unit being used to indicate whether the power module fails or not;

the constant current driving IC module failure alarm unit being used to indicate that whether the constant current driving IC module fails or not;

the output terminal of the power module being connected with the power source of the constant current driving IC module through the voltage converting module;

the output terminal of the power module being connected with the positive electrode of the LED strings through the boost module;

the boost module being provided with an over voltage alarm unit used to warn that the voltage of the positive electrode of the LED strings being high; and the over voltage alarm unit being also used to indicate whether the boost module fails or not.

17. The liquid crystal display device as claimed in claim 16, wherein the boost module of the LED backlight driving circuit comprises an energy storage inductor, a rectifier diode, a MOSFET, and an output electrolytic capacitor;

the positive electrode of the rectifier diode is connected with the power module through the energy storage inductor, the negative electrode of which is connected with the LED strings;

one end of the output electrolytic capacitor is connected with the negative electrode of the rectifier diode, and the other end is connected to the ground;

the drain of the MOSFET is connected with the positive electrode of the rectifier diode, the source of which is connected to the ground, the gate of which is connected with a MOS driving signal output terminal of the constant current driving IC module; and the over voltage alarm unit is connected between the energy storage inductor and the positive electrode of the rectifier diode.

* * * * *